United States Patent
Panguluri et al.

(10) Patent No.: US 10,031,899 B2
(45) Date of Patent: Jul. 24, 2018

(54) COMPUTING DEVICE AND CORRESPONDING METHOD FOR GENERATING DATA REPRESENTING TEXT

(71) Applicant: Gracenote Digital Ventures, LLC, New York, NY (US)

(72) Inventors: Venkatarama Anilkumar Panguluri, Milpitas, CA (US); Gregory P. Defouw, Redwood City, CA (US)

(73) Assignee: Gracenote Digital Ventures, LLC, New York, NY (US)

(*) Notice: Subject to any disclaimer, the term of this patent is extended or adjusted under 35 U.S.C. 154(b) by 493 days.

(21) Appl. No.: 14/322,627

(22) Filed: Jul. 2, 2014

(65) Prior Publication Data
US 2016/0004678 A1    Jan. 7, 2016

(51) Int. Cl.
*G06F 17/00*    (2006.01)
*G06F 17/24*    (2006.01)
*G06F 17/22*    (2006.01)
*G06F 17/30*    (2006.01)
*G06Q 30/02*    (2012.01)

(52) U.S. Cl.
CPC .......... *G06F 17/24* (2013.01); *G06F 17/2235* (2013.01); *G06F 17/30761* (2013.01); *G06F 17/30864* (2013.01); *G06F 17/30867* (2013.01); *G06F 17/30873* (2013.01); *G06Q 30/02* (2013.01)

(58) Field of Classification Search
CPC .......... G06F 17/21; G06F 17/27–17/28; G06F 17/2785; G06F 17/30017; G06F 17/30038; H04N 9/8715

USPC ........ 715/733, 230–233, 246–247, 817, 209, 715/251, 256; 386/244
See application file for complete search history.

(56) References Cited

U.S. PATENT DOCUMENTS

| | | |
|---|---|---|
| 8,040,548 B1 | 10/2011 | Siegel et al. |
| 8,190,419 B1 | 5/2012 | Kinder |
| 8,290,772 B1 | 10/2012 | Cohen et al. |
| 2007/0061023 A1 | 3/2007 | Hoffberg et al. |
| 2009/0083815 A1 | 3/2009 | McMaster et al. |
| 2010/0198581 A1* | 8/2010 | Ellis .................. G06F 17/248 704/4 |
| 2010/0241963 A1 | 9/2010 | Kulis et al. |
| 2011/0010243 A1 | 1/2011 | Wilburn et al. |
| 2011/0282651 A1 | 11/2011 | Nygaard et al. |
| 2011/0313757 A1 | 12/2011 | Hoover et al. |
| 2014/0278354 A1* | 9/2014 | Ganong, III .......... G10L 25/48 704/9 |

(Continued)

OTHER PUBLICATIONS

International Search Report and Written Opinion dated Mar. 17, 2015, issued in connection with International Patent Application No. PCT/US2014/072836, filed on Dec. 30, 2014.

(Continued)

*Primary Examiner* — Quoc A Tran
(74) *Attorney, Agent, or Firm* — McDonnell Boehnen Hulbert & Berghoff LLP

(57) ABSTRACT

An example method involves (i) accessing first data representing text; (ii) identifying a term within the represented text; (iii) using the identified term as a basis to select a text-editing rule from among a set of text-editing rules; (iv) generating second data that represents the represented text edited in accordance with the selected text-editing rule; and (v) providing output based on the generated second data.

20 Claims, 5 Drawing Sheets

(56) References Cited

U.S. PATENT DOCUMENTS

2015/0106698 A1* 4/2015 Albright .............. G06F 17/211
                                                                    715/244

OTHER PUBLICATIONS

Canadian Office Action dated Aug. 23, 2017, Application No. 2.951.422 filed Dec. 30, 2014.

* cited by examiner

COMPUTING DEVICE AND CORRESPONDING METHOD FOR GENERATING DATA REPRESENTING TEXT

CROSS REFERENCES TO RELATED APPLICATIONS

This disclosure relates to (i) U.S. patent application Ser. No. 14/322,611, entitled "Computing Device and Corresponding Method for Generating Data Representing Text," and (ii) U.S. patent application Ser. No. 14/322,633, entitled "Computing Device and Corresponding Method for Generating Data Representing Text," both of which (i) are assigned to the assignee of the present disclosure, (ii) are being filed simultaneously with the present disclosure, (iii) and are hereby incorporated by reference herein in their entirety.

USAGE AND TERMINOLOGY

In this disclosure, unless otherwise specified and/or unless the particular context clearly dictates otherwise, each usage of "a" or "an" means at least one, and each usage of "the" means the at least one.

BACKGROUND

Unless otherwise indicated herein, the materials described in this section are not prior art to the claims in this disclosure and are not admitted to be prior art by inclusion in this section.

To listen to the radio, a listener typically tunes a receiver to a particular frequency (e.g., an AM or FM frequency) and listens to music, news, or other audible content being broadcast on that frequency by a radio station. The listener may tune the receiver, and therefore select a radio station, in a variety of ways, such as by rotating a dial, pushing a seek button, or pushing a station preset button. By selecting one of multiple radio stations, the listener may exert some control over the audible content presented to the listener. However, although the listener may control which station is selected, the listener is unlikely to have any influence over the audible content that gets broadcast by the selected station.

Typically, a radio station broadcasts the same audible content to multiple receivers, and therefore to multiple listeners, at the same time. Given this, it is common for a radio station to produce and broadcast audible content that is intended to appeal to a variety of different listeners. However, while some listeners may find such audible content appealing, other listeners may find it unappealing because it is not tailored to their particular interests.

SUMMARY

In one aspect, a method is disclosed. The method involves (i) accessing first data representing text; (ii) identifying a term within the represented text; (iii) using the identified term as a basis to select a text-editing rule from among a set of text-editing rules; (iv) generating second data that represents the represented text edited in accordance with the selected text-editing rule; and (v) providing output based on the generated second data.

In another aspect, a non-transitory computer-readable medium is disclosed. The medium has stored thereon program instructions that when executed by a processor cause performance of the acts of the method described above.

In another aspect, a computing device is disclosed. The computing device includes a communication interface, a processor, and a non-transitory computer-readable medium having stored thereon program instructions that when executed by the processor cause the computing device to perform the acts of the method described above.

These, as well as other aspects, advantages, and alternatives, will become apparent to those of ordinary skill in the art by reading the following detailed description, with reference where appropriate to the accompanying drawings.

DETAILED DESCRIPTION

I. Overview

Figure 1:
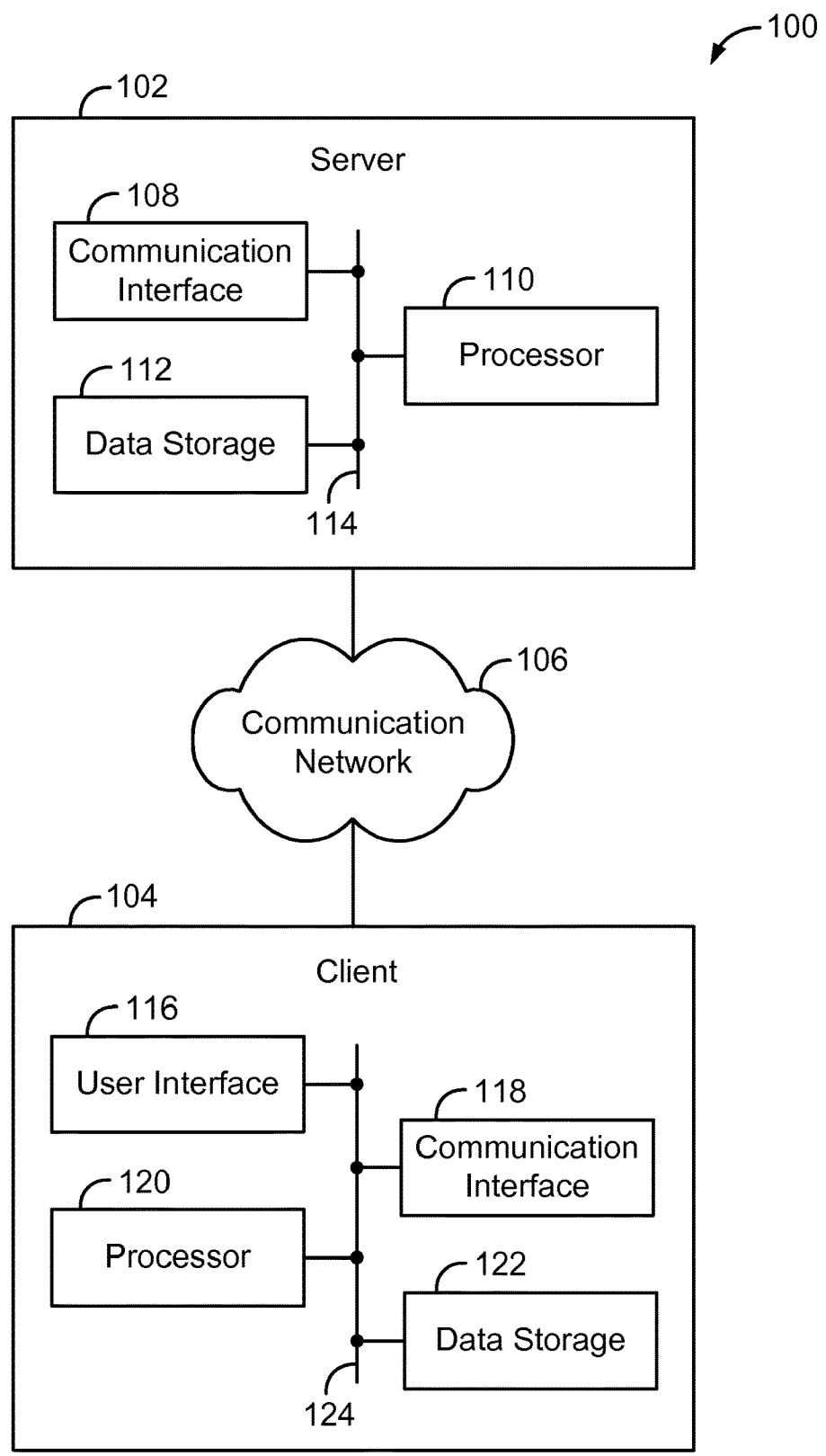
FIG. 1 is a simplified block diagram of an example system.

As indicated above, a radio station may produce and broadcast audible content that is intended to appeal to a variety of different listeners. For example, in the context of producing and broadcasting a news program, a narrator (such as a news anchor affiliated with the radio station, or another person) may read aloud news stories from each of a variety of different predetermined categories, such as sports, politics, and entertainment, and the audible readings may be included as part of the news program.

Although some listeners may be interested in audible versions of news stories from all of the predetermined categories, other listeners may have different interests. For example, one listener may be interested in sports and entertainment, but not politics, while another listener may be interested in politics and entertainment, but not sports. In either case, the listener may be presented with audible content that does not align with the listener's interests. As a result, the listener may find the news program unappealing.

One way to help address this issue is by implementing a system that provides a user with a personalized news program. In one example, such a system includes at least two computing devices, such as a server and a client, and a communication network through which the server and the client may communicate.

In this system, the server and the client may perform a variety of acts. For example, the server may determine a set of attributes associated with a user of the client and may use the determined set of attributes as a basis to generate a playlist of a personalized news program for the user. The generated playlist may define a sequence of media content items, each of which may include audio content, such as an audible version of a news story, and/or video content. An audible version of a news story may be referred to herein as an "audible news story." The generated playlist may also define media content attribute data respectively for each media content item, including for instance a reference to data representing the media content item and metadata characterizing the media content item. Collectively, this sequence of media content items may thus makeup a personalized news program.

After or as the server generates the playlist, the server may transmit the playlist to the client, and the client may traverse the entries of the playlist, retrieve data representing each referenced media content item, and use the data to play out each referenced media content item in accordance with the sequence defined by the playlist. In practice, for instance, for each media content item of the sequence, (i) the client may transmit to the server, or to another server for that matter, a request for data representing the media content item, (ii) the server may receive the transmitted request, (iii) responsive to the server receiving the transmitted request, the server may transmit to the client, the requested data, (iv) the client may receive the transmitted data, and (v) the client may play out for the user the media content item represented by the received data.

Optimally, this process may involve streaming of the data representing the media content items to the client and playout of the sequence of media content items in real time by the client. In particular, for each media content item referenced by the playlist, the client may request a server to stream the data representing the media content item to the client, and the client may then receive in response a data stream representing the requested media content item. As the client receives and buffers the requested data representing the media content items in sequence, the client may play out the represented media content items for a user, thus providing the user with a substantially continuous playout of the media content items that makeup the personalized news program.

As noted above, a media content item, such as an audible news story, may be represented by data. Data representing an audible news story may be generated in a variety of ways. In one example, a computing device may implement a four-phase technique to generate such data. Among other things, one or more portions of this technique may help ensure that the generated data is tailored for use in connection with a personalized news program as described above, despite the fact that the generated data may be derived from content originally created for another purpose, such as for use in connection with a newspaper or a news-related website.

In one example, a first phase of the technique may help extract, from data representing a news article, particular portions of data representing text, where the particular portions are likely to be useful in the context of providing a personalized news program to a user as described above. In one example, the first phase of the technique involves (i) the computing device accessing first data defining multiple portions of a content item, wherein at least a plurality of the portions represent text; (ii) the computing device selecting, from the plurality of portions representing text, a subset of the portions representing text, wherein the selecting is based on each portion of the selected subset having a particular characteristic; (iii) based on the text represented by the portions of the selected subset, the computing device generating second data that represents a concatenation of the text represented by the portions of the selected subset; and (iv) the computing device providing the generated second data as output.

In one example, a second phase of the technique may help edit the text represented by the output of first phase so that the text is likely to be more useful in the context of providing a personalized news program to a user as described above. In one example, the second phase of the technique involves (i) the computing device accessing the output second data representing text; identifying a term within the represented text; (ii) the computing device using the identified term as a basis to select a text-editing rule from among a set of text-editing rules; (iii) the computing device generating third data that represents the represented text edited in accordance with the selected text-editing rule; and (i) the computing device providing the generated third data as output.

In one example, a third phase of the technique may help edit the text represented by the output of second phase so that the text is even more useful in the context of providing a personalized news program to a user as described above. In one example, the third phase of the technique involves (i) the computing device accessing the output third data representing text, wherein the text defines at least one position representing a particular type of grammatical break between two portions of the text; (ii) the computing device identifying, from among the at least one position, a position that is closest to a target position within the text; (iii) based on the identified position within the text, the computing device generating fourth data that represents a proper subset of the text, wherein the proper subset extends from an initial position within the text to the identified position within the text; and (iv) the computing device providing the generated fourth data as output.

In one example, a fourth phase of the technique may use the text represented by the output of the third phase to generate audible content that is useful in the context of providing a personalized news program to a user as described above. In one example, the fourth phase of the technique involves (i) the computing device accessing the output fourth data representing text; (ii) the computing device using the fourth data to display the represented text to be read aloud by a narrator; (iii) the computing device recording the narrator's reading of the text, thereby generating fifth data representing an audible version of the text. In an alternative example, the fourth phase involves (i) the computing device accessing the output fourth data representing text; (ii) the computing device providing the fourth data to a text-to-speech (TTS) system that uses the fourth data to generate fifth data representing an audible version of the text.

II. Example System

FIG. 1 is a simplified block diagram of an example system 100 in which aspects of the present disclosure can be implemented. As shown, the system 100 includes at least two computing devices, namely a server 102 and a client 104, and a communication network 106. Generally, the server 102 and the client 104 are configured for communicating with each other via the communication network 106.

A. Server

The server 102 may be configured for performing a variety of functions or acts, such as those described in this disclosure (including the accompanying drawings). The server 102 may take a variety of forms and may include various components, including for example, a communication interface 108, a processor 110, and a data storage 112, all of which may be communicatively linked to each other via a system bus, network, or other connection mechanism 114.

The communication interface 108 may take a variety of forms and may be configured to allow the server 102 to communicate with one or more devices according to any number of protocols. For instance, the communication interface 108 may be configured to allow the server 102 to communicate with the client 104 via the communication network 106. In one example, the communication interface 108 may take the form of a wired interface, such as an Ethernet interface. As another example, the communication interface 108 may take the form of a wireless interface, such as a cellular or WI-FI interface.

The processor 110 may include a general purpose processor (e.g., a microprocessor) and/or a special purpose processor (e.g., a digital signal processors (DSP)).

The data storage 112 may include one or more volatile, non-volatile, removable, and/or non-removable storage components, such as magnetic, optical, or flash storage, and may be integrated in whole or in part with the processor 110. Further, the data storage 112 may take the form of a non-transitory computer-readable storage medium, having stored thereon program instructions (e.g., compiled or non-compiled program logic and/or machine code) that, when executed by the processor 110, cause the server 102 to perform one or more functions or acts, such as those described in this disclosure.

B. Client

Likewise, the client 104 may be configured for performing a variety of functions or acts such as those described in this disclosure. The client 104 may take a variety of forms, including for example, a mobile phone, tablet, laptop, media player, gaming device, wearable device, or vehicle. And the client 104 may include various components, including for example, a user interface 116, a communication interface 118, a processor 120, and a data storage 122, all of which may be communicatively linked with each other via a system bus, network, or other connection mechanism 124.

The user interface 116 may be configured for facilitating interaction between the client 104 and a user of the client 104, such as by receiving input from the user and providing output to the user. Thus, the user interface 116 may include input components such as a computer mouse, a keyboard, a touch-sensitive panel, or perhaps a microphone for receiving voice commands. In addition, the user interface 116 may include output components such as a display screen (which, for example, may be combined with a touch-sensitive panel) a sound speaker or other audio output mechanism, and a haptic feedback system. Furthermore, the user interface 116 may include a digital-analog conversion unit to facilitate playout of media content to a user. Moreover, the client 102 may provide output to the user via another user interface system (e.g., the client 102 may communicate with an audio output system via a short range wireless communication, such as a connection established in accordance with IEEE 802.15).

The communication interface 118 may take a variety of forms and may be configured to allow the client 104 to communicate with one or more devices according to any number of protocols. For instance, the communication interface 118 may be configured to allow the client 104 to communicate with the server 102 via the communication network 106. Further, the communication interface 118 may take the form of a wired or wireless interface.

The processor 120 may include a general purpose processor and/or a special purpose processor. The data storage 122 may include one or more volatile, non-volatile, removable, and/or non-removable storage components, and may be integrated in whole or in part with the processor 120. Further, the data storage 122 may take the form of a non-transitory computer-readable storage medium, having stored thereon program instructions that, when executed by the processor 120, cause the client 104 to perform one or more functions or acts, such as those described in this disclosure. Such program instructions may define or be part of a discrete software application, such a native app or web app, that can be executed upon user request for instance.

C. Communication Network

Generally, the communication network 106 may be configured to allow the server 102 and the client 104 to communicate with each other using any number of protocols. In addition, the communication network 106 may take a variety of forms, including for example a packet-switched network such as the Internet.

III. Example Operations

Figure 2:
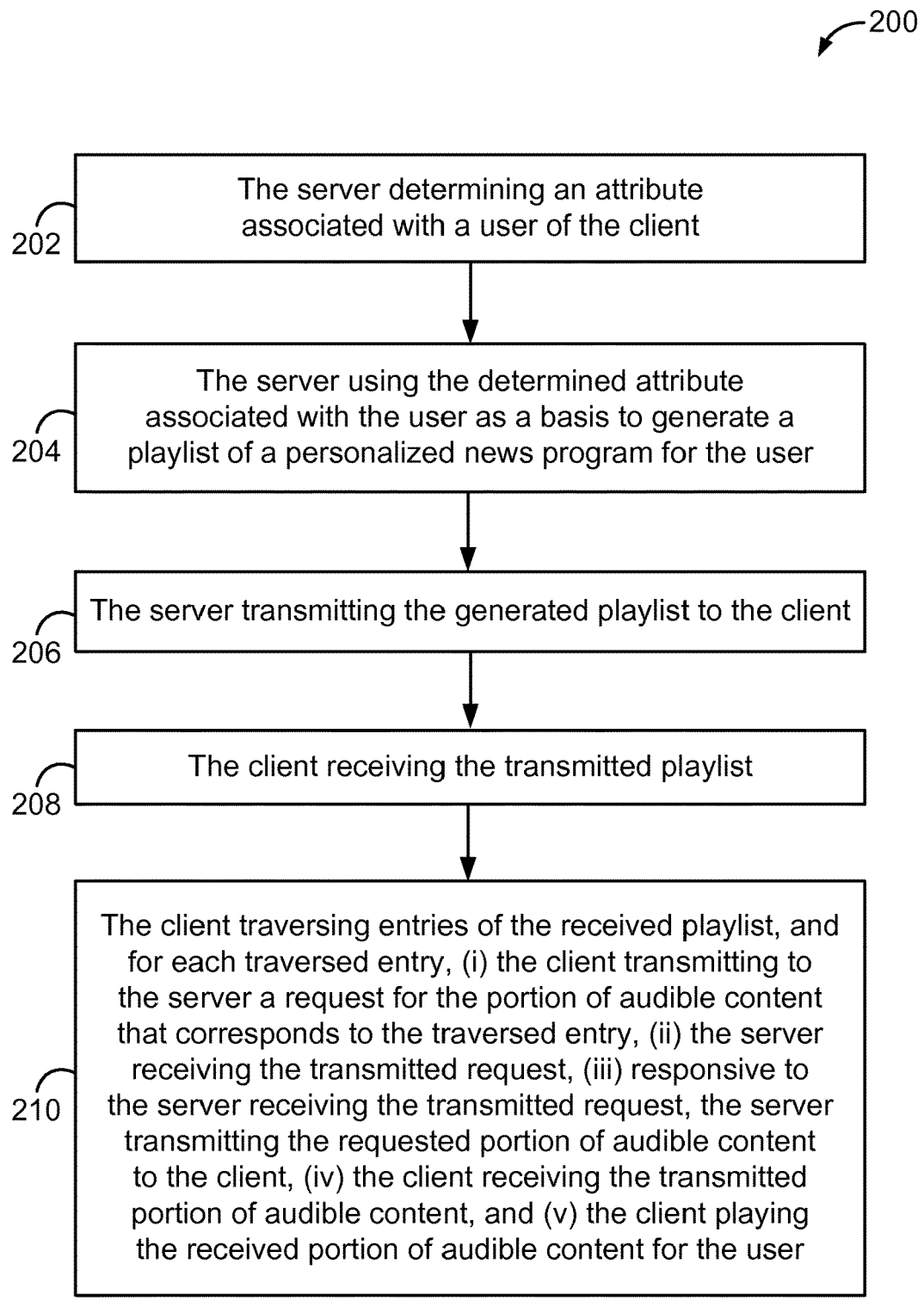
FIG. 2 is a flow chart depicting acts of an example method.

FIG. 2 is a flow chart depicting acts that can be carried out in an example method 200 for providing a user of the client 104 with a personalized news program.

At block 202, the method 200 involves the server 102 determining a set of (i.e., one or more) attributes associated with a user of the client 104. At block 204, the method 200 involves the server 102 using the determined set of attributes as a basis to generate a playlist of a personalized news program for the user. At block 206, the method 200 involves the server 102 transmitting the generated playlist to the client 104. At block 208, the method 200 involves the client 104 receiving the transmitted playlist.

At block 210, the method then involves the client 104 traversing the received playlist, and for each media content item referenced by the playlist, (i) the client transmitting to the server 102 a request for data representing that referenced media content item, (ii) the server 102 receiving the transmitted request, (iii) responsive to the server 102 receiving the transmitted request, the server 102 transmitting the requested data to the client 104, (iv) the client 104 receiving the transmitted data, and (v) the client 104 playing for the user (e.g., via a media content player) the media content item represented by the received data.

As noted above, a media content item, such as an audible news story, may be represented by data. Data representing an audible news story may be generated in a variety of ways. In one example, the server 102 may implement a four-phase technique to generate such data. Among other things, one or more portions of this technique may help ensure that the generated data is tailored for use in connection with a personalized news program as described above, despite the fact that the generated data may be derived from content originally created for another purpose, such as for use in connection with a newspaper or a news-related website.

Figure 3:
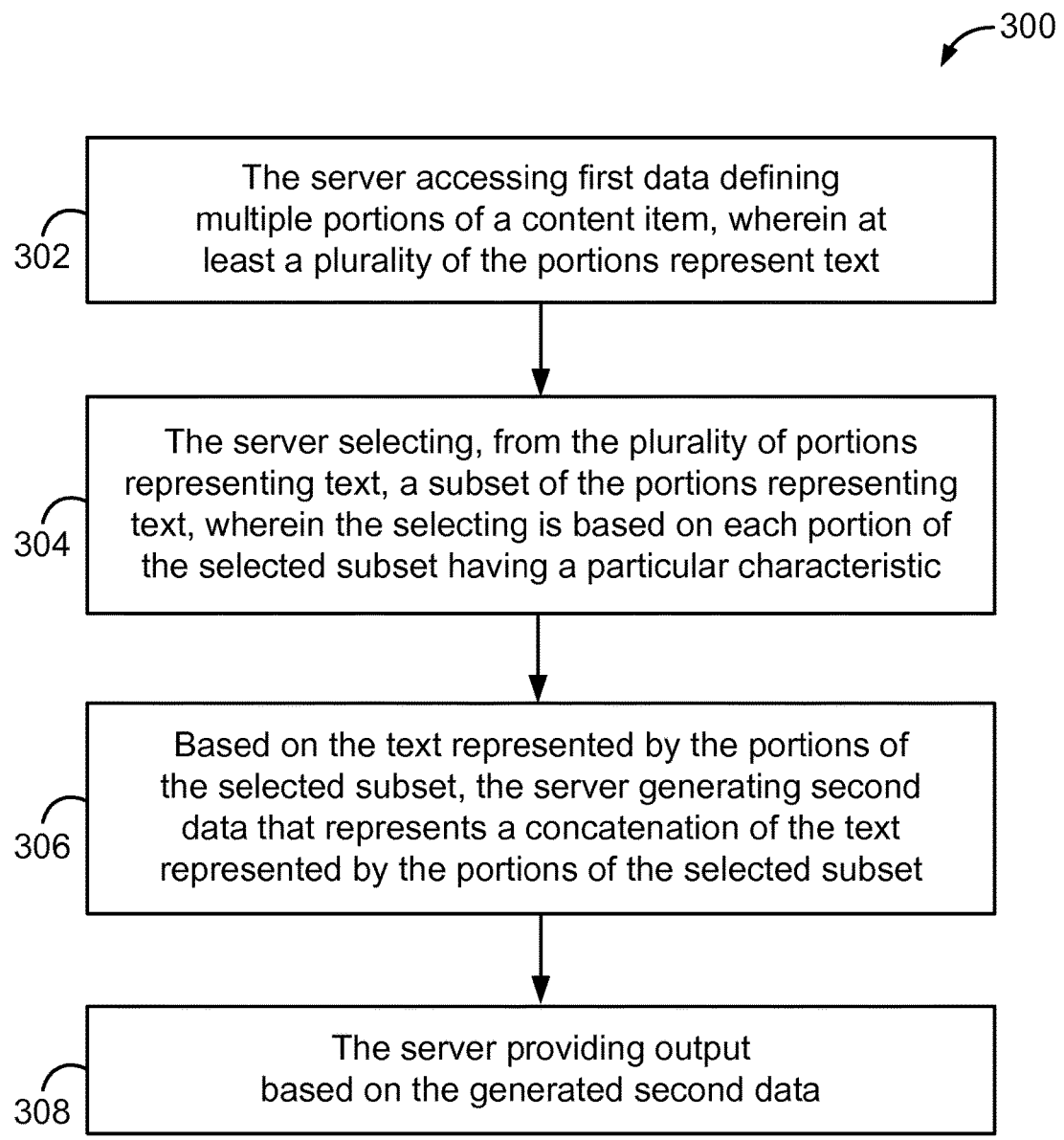
FIG. 3 is a flow chart depicting acts of another example method.

In one example, a first phase of the technique may help extract, from data representing a news article, particular portions of data representing text, where the particular portions are likely to be useful in the context of providing a personalized news program to a user as described above. FIG. 3 is a flow chart depicting acts that can be carried out in example method 300, which is an example implementation of the first phase of the technique.

At block 302, the method 300 involves the server 102 accessing first data defining multiple portions of a content item, wherein at least a plurality of the portions represent text. The first data may be stored in a data storage accessible to the server 102, and may be data previously used or intended for use in connection with another news-related product or service (e.g., a newspaper or a news-related website). The first data may be generated in a variety of ways. For example, a producer (or other individual) may use editorial software running on a computing device to produce and/or edit a news article based on a news story, and to generate the first data representing the news article, such that the first data may be stored, transferred, etc. As part of this process, for a given news article, the producer may provide or select various portions of text or other content to be part of the news article. Accordingly, a news article may be represented by data defining multiple portions of the news article.

As an example illustration, at block 302, the method 300 may involve the server 102 accessing data A defining portions A-F of a news article A. Portion A represents text specifying a headline section of a news article, namely "STORM MOVING TOWARDS EAST COAST." Portion B represents an image related to the news story, namely an image of a storm. Portion C represents text specifying a caption for the image, namely "PHOTO OF A FIRST GLIMPSE OF THE STORM.". Portion D represents text specifying a byline section of the news article, namely "BY JOHN SMITH.". Portion E represents text specifying a body section of the news article, namely "BREAKING NEWS: A MAJOR STORM IS EXPECTED TO APPROACH THE EAST COAST THIS FRIDAY AT 5 PM EST . . . FOR EMERGENCY ASSISTANCE, DIAL 911. RELATED ARTICLE: HURRICANE NEAR EAST COAST." (where the phrase HURRICANE NEAR EAST COAST is a hyperlink to a web page of a related news article). And Portion F represents text specifying keyword tags (e.g., for use by a search engine), namely "HURRICANE, STORM, WEATHER, COAST.". In this illustration, a plurality of the portions A-F, namely the portions A and C-F, represent text.

At block 304, the method 300 involves the server 102 selecting, from the plurality of portions representing text, a subset of the portions representing text, wherein the selecting is based on each portion of the selected subset having a particular characteristic. In one example, this involves the server 102 selecting, from the plurality of portions representing text, a proper subset of the portions representing text.

In the case where the content item is a news article, each portion of the selected subset having the particular characteristic may include each portion of the selected subset representing content from at least one section from a predefined set of sections of the news article. In one example, the predefined set of sections may consist of sections having content that is well-suited for inclusion in an audible news story for use in connection with a personalized news program as described above. As one example, the predefined set of sections may consist of a headline section, a byline section, and a body section. Other predefined sets of sections are possible as well.

Additionally or alternatively, each portion of the selected subset having the particular characteristic may include each portion of the selected subset representing text. Other particular characteristics are possible as well.

Continuing with the illustration above, in the case where each portion of the selected subset having the particular characteristic includes each portion of the selected subset representing content from at least one section from a predefined set of sections of the news article, and where the predefined set of sections consists of a headline section, a byline section, and a body section, at block 304, the method 300 may involve the server 102 selecting, from the plurality of portions A and C-F, a subset of portions A, D, and E.

At block 306, the method 300 involves, based on the text represented by the portions of the selected subset, the server 102 generating second data that represents a concatenation of the text represented by the portions of the selected subset.

Continuing with the illustration above, at block 306, the method 300 may involve the server 102 generating data B that represents a concatenation of the text represented by the portions A, D, and E, i.e., "STORM MOVING TOWARDS EAST COAST. BY JOHN SMITH. BREAKING NEWS: A MAJOR STORM IS EXPECTED TO APPROACH THE EAST COAST THIS FRIDAY AT 5 PM EST . . . FOR EMERGENCY ASSISTANCE, DIAL 911. RELATED ARTICLE: HURRICANE NEAR EAST COAST."

At block 308, the method 300 involves the server 302 providing output based on the generated second data. In one example, this may involve the server 102 providing the generated second data as output. As another example, this may involve the server 102 providing a subset of, or a modified version of, the generated second data as output.

In one example, the server 102 providing output based on the generated second data may involve the server 102 transmitting to a computing device (e.g., the client 104), output based on the generated second data. And in another example, the generated second data may be used in connection with another method, such as one or more of the other example methods described in this disclosure. As such, the server 102 may use the output provided by one method as input in connection with another method. Additionally or alternatively, the server 102 may cause the generated second data to be stored in a data storage accessible to the server 102 such that it may be retrieved at a later time by the server 102 or by another computing device.

Figure 4:
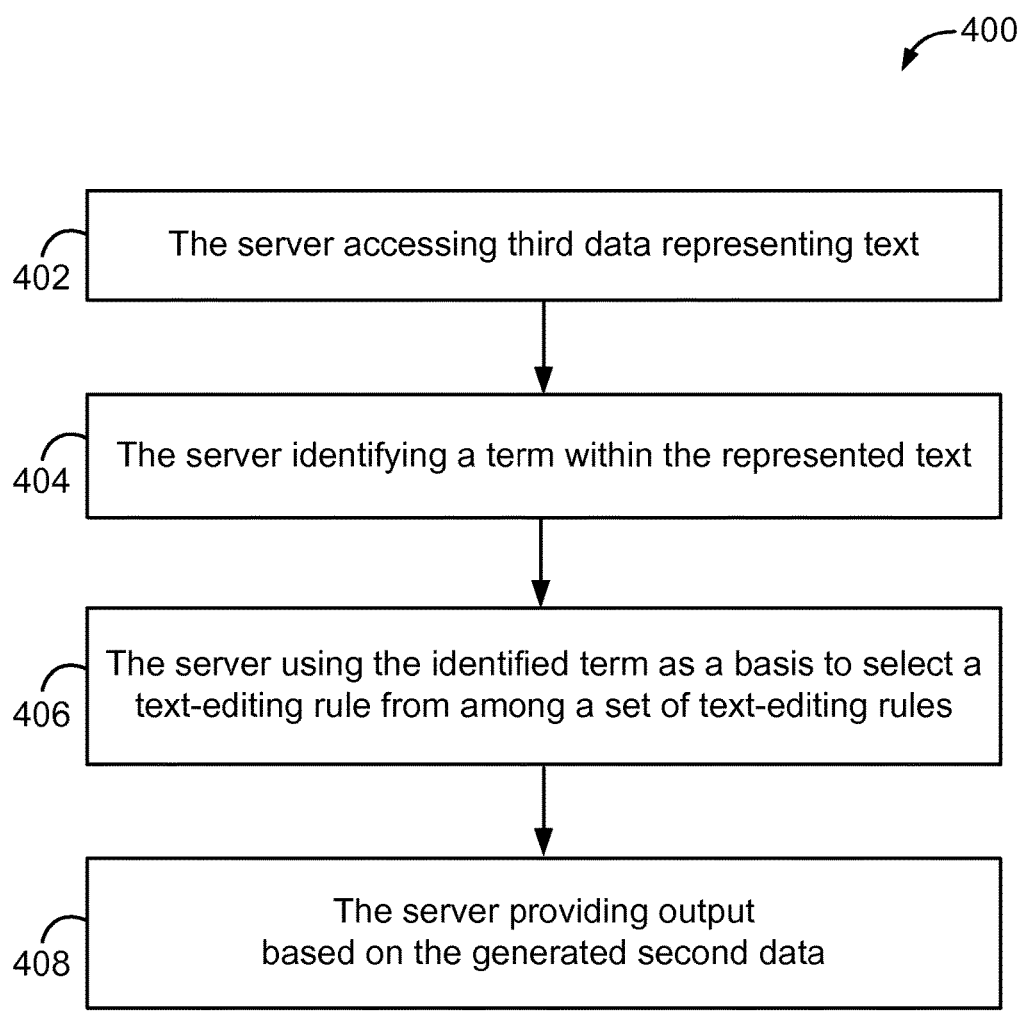
FIG. 4 is a flow chart depicting acts of yet another example method.

In one example, a second phase of the technique may help edit the text represented by the output of first phase so that the text is likely to be more useful in the context of providing a personalized news program to a user as described above. FIG. 4 is a flow chart depicting acts that can be carried out in method 400, which is an example implementation of the second phase of the technique.

At block 402, the method 400 involves the server 102 accessing third data representing text. The third data may be stored in a data storage accessible to the server 102, and may be data previously used or intended for use in connection with another news-related product or service (e.g., a website or newspaper). The third data may be generated in a variety of ways, such as those described above in connection with the first data. Alternatively, the third data may be the output of the method 300. As such, in one example, the represented text may be text of a news article.

Continuing with the illustration above, in the case where the third data is the output of the method 300, the third data is the data B representing the text "STORM MOVING TOWARDS EAST COAST. BY JOHN SMITH. BREAKING NEWS: A MAJOR STORM IS EXPECTED TO APPROACH THE EAST COAST THIS FRIDAY AT 5 PM EST . . . FOR EMERGENCY ASSISTANCE, DIAL 911. RELATED ARTICLE: HURRICANE NEAR EAST COAST."

At block 404, the method 400 involves the server 102 identifying a term within the represented text. As used herein, a term may include one or more words. At block 406, the method 400 involves the server 102 using the identified term as a basis to select a text-editing rule from among a set of text-editing rules. And at block 406, the method 400 involves the server 102 generating fourth data that represents the represented text edited in accordance with the selected text-editing rule.

As such, the server 102 may use an identified term as a basis for selecting a text-editing rule. In one example, the server 102 may use mapping data, perhaps stored in a data storage accessible to the server 102, to map an identified term to a particular text-editing rule. Such mapping data may be configured to logically link terms with text-editing rules for the purposes of "cleansing" text before it is used as a basis to generate data representing an audible news story for use in connection with a personalized news program as described above.

The identified term may take a variety of forms. For example, the identified term may be a term such as "BREAKING NEWS:", "RELATED ARTICLES:", "READ ALSO:", "SEE ALSO:", "EDITOR'S NOTE:", "CORRECTION NOTICE:". The selected text-editing rule may also take a variety of forms. For example, the selected text-editing rule may be a rule of editing specified text by at least removing from the specified text the identified term. In another example, the selected text-editing rule may be a rule of editing specified text by at least removing from the specified text a hyperlink following the identified term. This may be appropriate when a particular term signals that a hyperlink is likely to follow that term, and where is may be desired to remove both the term and the hyperlink before the text is used as a basis to generate data representing an audible news story.

As yet another example, the selected text-editing rule may be a rule of editing specified text by at least removing from the specified text a sentence following the identified term. As still another example, the selected text-editing rule may be a rule of editing specified text by at least removing from the specified text a paragraph following the identified term. Other types of rules are possible as well, and mappings between identified terms and rules may be configured in various ways depending on the manner in which text is desired to be cleansed.

In some instances, the server 102 identifying a term within the represented text may involve the server identifying multiple terms within the represented text. Further, the server 102 using the identified term as a basis to select a text-editing rule from among a set of text-editing rules may involve using the identified terms as a basis to select respective text-editing rules from among the set of text-editing rules. And finally, the server 102 generating second data that represents the represented text edited in accordance with the selected text-editing rule may involve the server 102 generating second data that represents the represented text edited in accordance with the selected text-editing rules.

Continuing with the illustration above, in the case where one identified term is "BREAKING NEWS:" and the respectively selected text-editing rule is a rule of editing specified text by at least removing from the specified text the identified term, and where another identified term is "RELATED ARTICLE:" and where the respectively selected text-editing rule is a rule of editing specified text a hyperlink following the identified term, at block 408, the method 400 may involve the server 102 generating data C that represents the text "STORM MOVING TOWARDS EAST COAST. BY JOHN SMITH. A MAJOR STORM IS EXPECTED TO APPROACH THE EAST COAST THIS FRIDAY AT 5 PM EST . . . FOR EMERGENCY ASSISTANCE, DIAL 911."

While it may be desired to include the terms "BREAKING NEWS:" and "RELATED ARTICLE: HURRICANE NEAR EAST COAST." in a news article, it may not likewise be desired to have such terms be as part of a corresponding audible news story that is used in connection with a personalized news program. As such, as shown in the example above, such terms may be removed from the text before the text is used to generate data representing a audible news story.

At block 408, the method 400 involves the server 402 providing output based on the generated fourth data. In one example, this may involve the server 102 providing the generated fourth data as output. As another example, this may involve the server 102 providing a subset of, or a modified version of, the generated fourth data as output.

In one example, the server 102 providing output based on the generated fourth data may involve the server 102 transmitting to a computing device (e.g., the client 104), output based on the generated fourth data. And in another example, the generated fourth data may be used in connection with another method, such as one or more of the other example methods described in this disclosure. As such, the server 102 may simply use the output provided by one method as input in connection with another method. Additionally or alternatively, the server 102 may cause the generated fourth data to be stored in a data storage accessible to the server 102 such that it may be retrieved at a later time by the server 102 or by another computing device.

Figure 5:
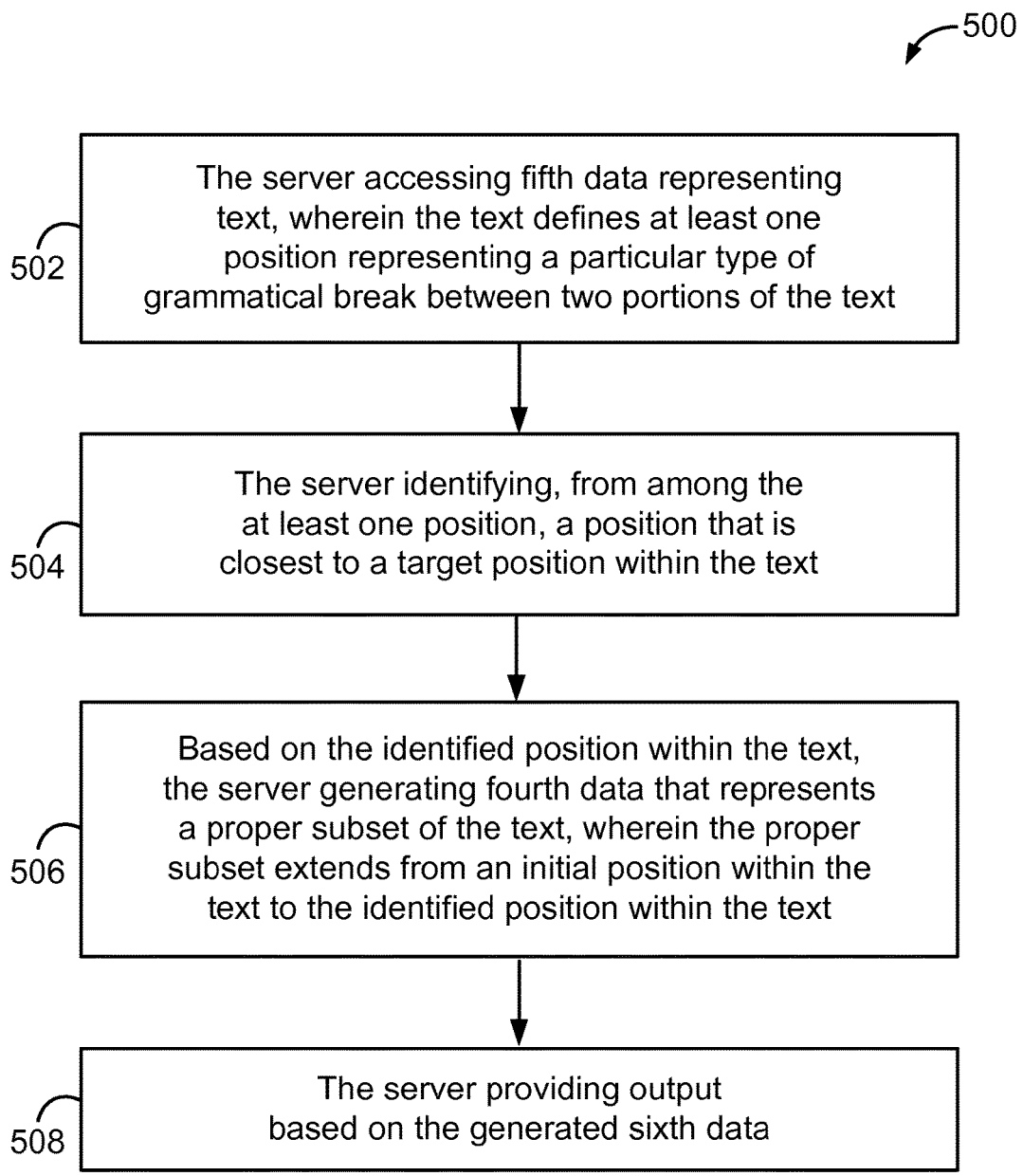
FIG. 5 is a flow chart depicting acts of still another example method.

In one example, a third phase of the technique may help edit the text represented by the output of second phase so that the text is more likely to be useful in the context of providing a personalized news program to a user as described above. FIG. 5 is a flow chart depicting acts that can be carried out in method 500, which is an example implementation of the third phase of the technique described above.

At block 502, the method 500 involves the server 102 accessing fifth data representing text, wherein the text defines at least one position representing a particular type of grammatical break between two portions of the text. The fifth data may be stored in a data storage accessible to the server 102, and may be data previously used or intended for use in connection with another news-related product or service (e.g., a website or newspaper). The fifth data may be generated in a variety of ways, such as those described above in connection with the first data or the third data. Alternatively, the fifth data may be the output of the method 400. As such, in one example, the represented text may be text of a news article.

The particular type of grammatical break between the two portions of the text may take a variety of forms. As one example, it may be a paragraph break between two paragraphs of the text. As another example, it may be a sentence break between two paragraphs of the text. Other types of grammatical breaks are possible as well. Such breaks may be represented in a variety of ways, such as with special (typically non-printable) characters in the text, for instance.

At block 504, the method 500 involves the server 102 identifying, from among the at least one position, a position that is closest to a target position within the text. And at block 506, the method 500 involves based on the identified position within the text, the server 102 generating sixth data that represents a proper subset of the text, wherein the proper subset extends from an initial position within the text to the identified position within the text. As a result, the sixth data represents text that is a shortened version of the text represented by the fifth data.

As indicated above, the target position may be predetermined to yield certain types of results. In one example, the target position may be within a range from a first position to a second position, where the first position is positioned after 100 words from a beginning of the text, and where the second position is positioned before 130 words from the beginning of the text. In a more particular example, the first position is positioned after 124 words from the beginning of the text, and the second position is positioned before 126 words from the beginning of the text. As such, in one example, the target position may be approximately 125 words into the text, which when spoken by a human or machine, translates into roughly one to two minutes of speech. In some instances, this may be considered an optimal number of words for an audible news story. However, other numbers of words, and therefore other target positions, are also possible.

As described above, the act at block 504 involves the server 102 identifying, from among the at least one position, a position that is closest to a target position within the text. This ensures that the identified position represents a particular type of grammatical break between two portions of the text. As such, in the case where the particular type of grammatical break is a paragraph break, at block 504, the server may identify the closest non-paragraph-break position to the target position. Likewise, in the case where the particular type of grammatical break is a sentence break, at block 504, the server may identify the closest non-sentence-break position to the target position. With this approach, text can be shortened to be closest to an optimal length, but while still having certain grammatical properties. This may be beneficial when the text is used to generate data representing an audible news such the audible news story has a desired length, but without having to end mid-paragraph or mid-sentence.

In some instances, it may be desired to for the server 102 to determine that the server 102 cannot identify a first type of position within a threshold range of the target position, and in response, identify a second type of position within the threshold range of the target position. For instance, the server 102 may determine that the server 102 cannot identify a non-paragraph-break position within a threshold range of the target position, and in response, the server 102 may identify a non-sentence-break position that is closest to the target position.

At block 508, the method 500 involves the server 102 providing output based on the generated sixth data. In one example, this may involve the server 102 providing the generated sixth data as output. As another example, this may involve the server 102 providing a subset of, or a modified version of, the generated sixth data as output.

In one example, the server 102 providing output based on the generated sixth data may involve the server 102 transmitting to a computing device (e.g., the client 104), output based on the generated sixth data. And in another example, the generated sixth data may be used in connection with another method, such as one or more of the other example methods described in this disclosure. As such, the server 102 may simply use the output provided by one method as input in connection with another method. Additionally or alternatively, the server 102 may cause the generated sixth data to be stored in a data storage accessible to the server 102 such that it may be retrieved at a later time by the server 102 or by another computing device.

In one example, a fourth phase of the technique may use the text represented by the output of the third phase to generate audible content that is useful in the context of providing a personalized news program to a user as described above.

In one example, the fourth phase of the technique involves the server 102 accessing seventh data representing text. The seventh data may be stored in a data storage accessible to the server 102, and may be data previously used or intended for use in connection with another news-related product or service (e.g., a website or newspaper). The seventh data may be generated in a variety of ways, such as those described above in connection with the first data, the third data, or the fifth data. Alternatively, the seventh data may be the output of the method 500. As such, in one example, the represented text may be text of a news article.

In one example, the fourth phase of the technique further involves using the seventh data to display the represented text to be read aloud by a narrator, and recording the narrator's reading of the text, thereby generating eight data representing an audible version of the text. In an alternative example, the fourth phase involves the server 102 accessing seventh data representing text, and providing the seventh data to TTS system that uses the seventh data to generate eight data representing an audible version of the text. In either case, the server 102 may then use the generated eight data in connection with providing a personalized news program as described above (e.g., by transmitting to the client based on a playlist).

IV. Example Variations

The variations described in connection with select examples of the disclosed system and method may be applied to all other examples of the disclosed system and method.

Further, while one or more acts have been described as being performed by or otherwise related to certain devices or entities (e.g., the server 102 or the client 104), the acts may be performed by or otherwise related to any device or entity. As such, any function that has been described as being performed by the server 102 could alternatively be performed by a different server or by the client 104.

Further, the acts need not be performed in the disclosed order, although in some examples, an order may be preferred. Also, not all acts need to be performed to achieve the desired advantages of the disclosed system and method, and therefore not all acts are required.

Also, while the disclosed methods have been described principally in connection with providing a personalized news program, the methods may be applied in connection with other applications or environments.

While select examples of the disclosed system and method have been described, alterations and permutations of these examples will be apparent to those of ordinary skill in the art. Other changes, substitutions, and alterations are also possible without departing from the disclosed system and method in its broader aspects as set forth in the following claims.

The invention claimed is:

1. A method comprising:
    accessing first data representing text;
    identifying a term within the represented text;
    using the identified term as a basis to select a text-editing rule from among a set of text-editing rules;
    generating second data that represents the represented text edited in accordance with the selected text-editing rule; and
    providing output based on the generated second data.

2. The method of claim 1, wherein the selected text-editing rule comprises a rule of editing specified text by at least removing from the specified text the identified term.

3. The method of claim 1, wherein the selected text-editing rule comprises a rule of editing specified text by at least removing from the specified text a sentence following the identified term.

4. The method of claim 1, wherein the selected text-editing rule comprises a rule of editing specified text by at least removing from the specified text a paragraph following the identified term.

5. The method of claim 1, wherein the selected text-editing rule comprises a rule of editing specified text by at least removing from the specified text a hyperlink following the identified term.

6. The method of claim 1, wherein the represented text comprises text of a news article.

7. The method of claim 1, wherein providing output based on the generated second data comprises providing the generated second data as output.

8. The method of claim 1, wherein providing output based on the generated second data comprises transmitting to a computing device, output based on the generated second data.

9. A non-transitory computer-readable medium having stored thereon program instructions that when executed by a processor cause performance of a set of acts, the set of acts comprising:
   accessing first data representing text;
   identifying a term within the represented text;
   using the identified term as a basis to select a text-editing rule from among a set of text-editing rules;
   generating second data that represents the represented text edited in accordance with the selected text-editing rule; and
   providing output based on the generated second data.

10. The computer-readable medium of claim 9, wherein the selected text-editing rule comprises a rule of editing specified text by at least removing from the specified text the identified term.

11. The computer-readable medium of claim 9, wherein the selected text-editing rule comprises a rule of editing specified text by at least removing from the specified text a sentence following the identified term.

12. The computer-readable medium of claim 9, wherein the selected text-editing rule comprises a rule of editing specified text by at least removing from the specified text a paragraph following the identified term.

13. The computer-readable medium of claim 9, wherein the selected text-editing rule comprises a rule of editing specified text by at least removing from the specified text a hyperlink following the identified term.

14. The computer-readable medium of claim 9, wherein the represented text comprises text of a news article.

15. The computer-readable medium of claim 9, wherein providing output based on the generated second data comprises providing the generated second data as output.

16. The computer-readable medium of claim 9, wherein providing output based on the second data comprises transmitting to a computing device, output based on the generated second data.

17. A computing device comprising:
   a communication interface;
   a processor; and
   a non-transitory computer-readable medium having stored thereon program instructions that when executed by the processor cause the computing device to perform a set of acts, the set of acts comprising:
      accessing first data representing text;
      identifying a term within the represented text;
      using the identified term as a basis to select a text-editing rule from among a set of text-editing rules;
      generating second data that represents the represented text edited in accordance with the selected text-editing rule; and
      providing, via the communication interface, output based on the generated second data.

18. The computing device of claim 17, wherein the selected text-editing rule comprises a rule of editing specified text by at least removing from the specified text the identified term.

19. The computing device of claim 17, wherein the selected text-editing rule comprises a rule of editing specified text by at least removing from the specified text a sentence following the identified term.

20. The computing device of claim 17, wherein the selected text-editing rule comprises a rule of editing specified text by at least removing from the specified text a paragraph following the identified term.

\* \* \* \* \*